United States Patent [19]

Peterson

[11] Patent Number: 4,656,910

[45] Date of Patent: Apr. 14, 1987

[54] BELT SKIVING METHOD AND APPARATUS

[75] Inventor: Paul J. Peterson, Cuyahoga Falls, Ohio

[73] Assignee: The Goodyear Tire & Rubber Company, Akron, Ohio

[21] Appl. No.: 835,591

[22] Filed: Mar. 3, 1986

[51] Int. Cl.⁴ .............................................. B26D 3/06
[52] U.S. Cl. ...................................... 83/875; 83/861;
83/856; 83/56
[58] Field of Search ................. 83/875, 861, 175, 856,
83/857, 858, 56, 925 R; 144/133, 136

[56] References Cited

U.S. PATENT DOCUMENTS 3,218,895 11/1965 Gilbert et al. ..................... 83/875 X
3,995,516 12/1976 Boily et al. ........................ 83/875 X
4,315,450 2/1982 Pray ................................... 83/875 X
4,342,349 8/1982 Lipman ............................. 83/875 X Primary Examiner—Donald R. Schran
Attorney, Agent, or Firm—R. D. Thompson

[57] ABSTRACT

There is disclosed a method for cutting longitudinal channels or strips in the cover of a rubber conveyor belt using an apparatus which includes a U-shaped blade set at a specified angle relative to the surface of the conveyor belt and a sharp cutting edge. The apparatus skives a longitudinal strip from the conveyor belt rubber cover upon moving the belt or the cutting apparatus relative to the belt. The belt with the longitudinal strips removed is useful as a conveying device which can readily trough or fold over the load being conveyed.

10 Claims, 7 Drawing Figures

BELT SKIVING METHOD AND APPARATUS

BACKGROUND OF THE INVENTION

This invention relates to a cutting apparatus for rubber articles, in particular the removal of longitudinal strips from a conveyor belt.

Longitudinal or transverse grooves or channels are desirable in certain types of rubber conveyor belts. The channels may be useful to allow liquids to run off the conveyor belt or for stripping away the covers of the conveyor for the purpose of applying a mechanical fastener to splice belt ends together. Removal of the covers of a conveyor belt can be accomplished with difficulty by hand tools which are used to cut the rubber covers from the reinforcement. Such hand tools are generally limited to the removal of a few centimeters of cover from the edge of a belt. In certain belt designs it is desirable to remove a portion of the belt cover, either the top cover or the bottom cover, to enhance flexibility of the belt at that localized position. This is useful to promote troughing of the belt to enclose greater loads for a given conveyor width. These longitudinal grooves or channels must extend the full running length of the belt. A previously known method for providing such a full length longitudinal groove in a rubber belt cover is to mold the channel into the rubber belt cover during vulcanization of the belt. Another known method is to use a buffing apparatus similar to the devices used to buff off rubber tread prior to retreading a tire carcass. Sandstone wheels are also useful as buffing devices but all buffing operations generate objectionable dust and fragments of rubber. In addition, smoke and other vapors may be generated which are environmentally objectionable and this is true especially where very long longitudinal grooves are being provided in the belt cover.

This invention provides an apparatus and method useful in producing longitudinal grooves in a previously cured rubber belt structure. An advantage of the apparatus is that it can provide an exactly controlled depth of cut as well as width and profile of the groove being cut in the belt cover. The apparatus is adapted to provide a strip of indeterminate length and may be used continuously to provide exact dimension grooves in very long length conveyor belt by attachment to appropriate anchoring devices.

BRIEF DESCRIPTION OF THE INVENTION

This invention provides a cutting apparatus for skiving a longitudinal strip from a rubber conveyor belt including: a U-shaped blade composed of a cutting portion connecting to upward extending arms, said cutting portion having a sharp cutting edge with an upper surface and a lower surface forming a taper angle therebetween; a blade holding means fixedly attached to said upwardly extending arms, said blade holding means adapted to maintain said upper surface of said cutting edge at an acute angle relative to the conveyor belt.

The cutting apparatus just described is useful in a method for forming longitudinal grooves of predetermined depth in a rubber belt having a top surface, a top cover, a bottom cover and a plurality of reinforcing layers positioned between said top cover and bottom cover including: positioning a U-shaped blade a predetermined depth below the top surface of the rubber belt, said U-shaped blade having a pair of parallel upwardly extending legs connected by a cutting portion with a cutting edge having an upper surface and a lower surface forming a taper angle therebetween, said upper surface of said cutting edge forming an acute angle with said top surface of the belt; supporting said rubber belt by a support means adapted to position said belt such that the cutting edge of said blade is at said predetermined depth below the top surface of said belt, said taper angle being between about 5° and about 25°; moving said belt in a path substantially perpendicular to said cutting edge of said blade, whereupon a longitudinal strip of said belt is continuously skived from said belt, said longitudinal strip having a transverse cross-section equal in width to the distance between said parallel upwardly extending arms of said blade and having a thickness equal to said predetermined depth; removing said longitudinal strip continuously from said cutting edge of said blade.

DETAILED DESCRIPTION OF THE INVENTION

Figure 1:
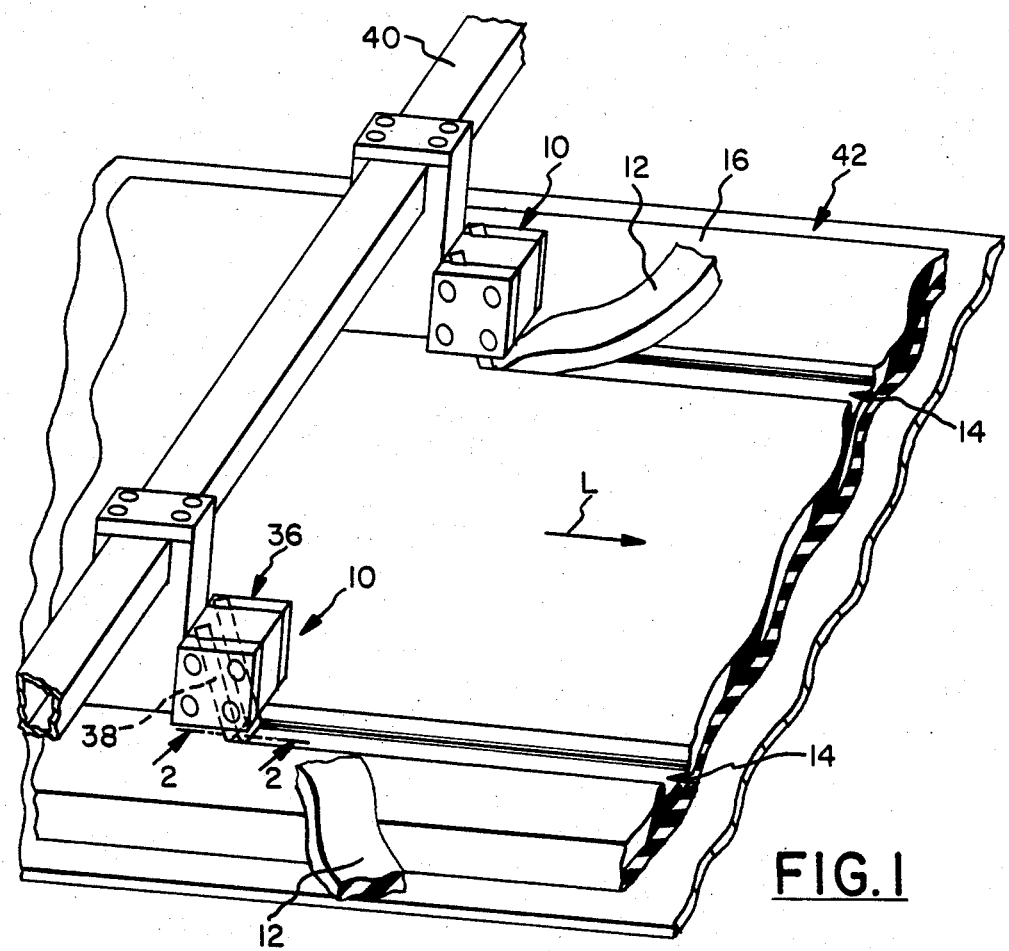
FIG. 1 is a fragmentary perspective view of a pair of cutting apparatus according to the invention mounted for skiving a pair of longitudinal strips from the cover of a cured rubber conveyor belt.
Figure 2:
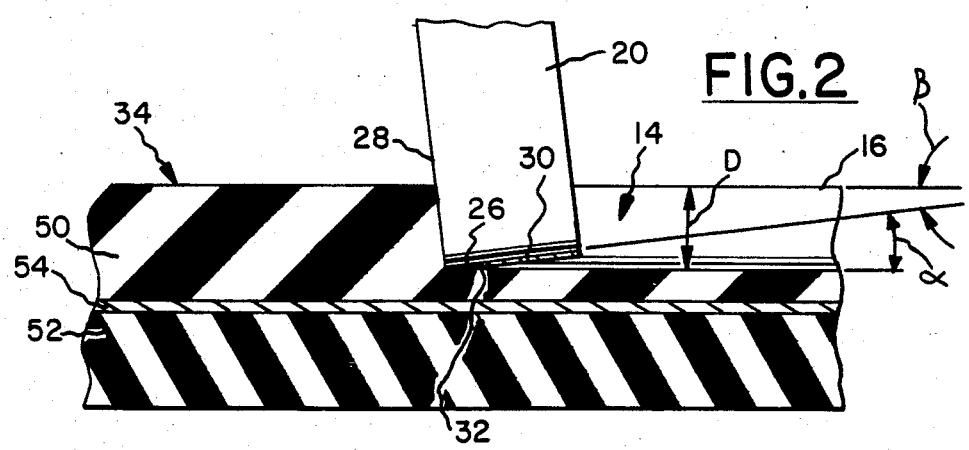
FIG. 2 is an enlarged cross-sectional view of a cutting apparatus of the invention taken along line 2—2 in FIG. 1.
Figure 3:
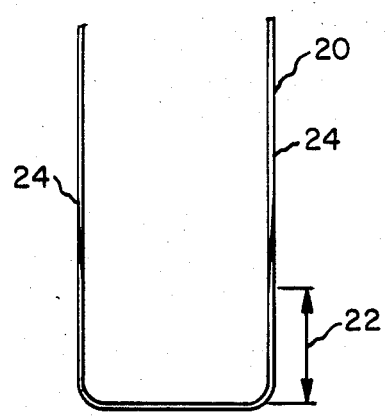
FIG. 3 is an enlarged fragmentary view of the cutting apparatus shown in FIG. 2 taken along line 3—3.
Figure 4:
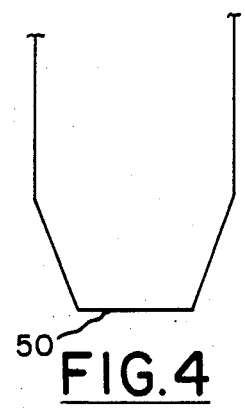
FIG. 4 is an alternate U-shaped blade configuration having rectilinear side portions.
Figure 5:
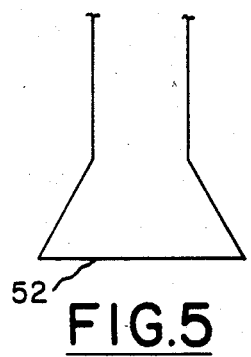
FIG. 5 is an alternative U-shaped blade configuration having a cutting portion outwardly sloped from the arms.
Figure 6:
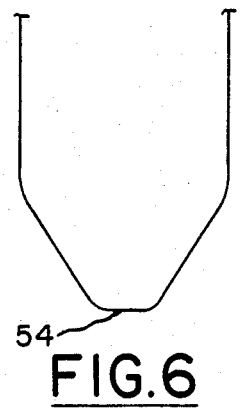
FIG. 6 is an alternative U-shaped blade having curvilinear edges and a narrow cutting edge.

Referring now to FIGS. 1, 2 and 3, a cutting apparatus generally indicated by the reference character 10 is shown removing strips 12 along the longitudinal direction indicated by arrow L leaving a pair of longitudinal grooves 14 in the conveyor belt 16. The cutting apparatus 10 is made up of a U-shaped blade 20 having a cutting portion 22 connected to upwardly extending arms 24. The cutting portion 22 has a sharp cutting edge 26 which forms a portion of the leading edge 28. The cutting edge includes an upper surface 30 and a lower surface 32 which form a taper angle $\alpha$ therebetween. A suitable taper angle $\alpha$ is believed to lie between about 5 and about 25 degrees. Generally preferred $\alpha$ is between about 10 and about 20 degrees. The most preferred taper angle has been found to be between about 13 and about 17 degrees.

The cutting apparatus must include a means for holding the U-shaped blade in an exact orientation relative to the conveyor belt surface 34. The blade holding means shown in FIG. 1 is a holder 36 which includes slots 38 provided in the body oriented at a predetermined angle. The holder 36 is rigidly affixed to a support 40 which is positioned at an exact distance from the belt surface. The belt is positioned on a table 42.

The cutting apparatus 10 is positioned relative to the belt such that the lower surface 32 of the cutting edge is substantially parallel or at a very slight angle to the upper surface 34 of conveyor belt 16. This angle may range from 0 to about 15 degrees above or below the belt surface 34. The relationship between the upper surface 30 of the cutting edge and the upper surface 34 of the conveyor belt has been found to be very important. The acute angle $\beta$ formed between the belt surface 34 and the upper surface 30 of the cutting edge must be an acute angle between about 5 degrees and about 25 degrees. The acute angle is preferably between about 10 and 20 degrees. The most preferred range is between about 13 and about 17 degrees.

The preferred placement of the U-shaped blade relative to the belt surface 34 is one in which the acute angle $\beta$ is substantially equal to or greater than the taper angle $\alpha$. The most preferred orientation of the blade in the cutting apparatus is when the acute angle $\beta$ is slightly greater than the taper angle $\alpha$.

Figure 7:
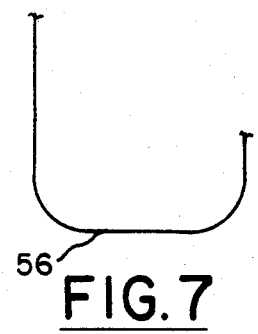
FIG. 7 is a U-shaped blade having a single upwardly extending arm.

The grooves 14 are formed in the belt by positioning the belt 16 on the belt support table 42 in a plane parallel to the cutting edge of the U-shaped blade. In the preferred form of the method shown in FIG. 1, the belt 16 is moved in the direction L while the cutting apparatus is held stationary by the support 40. Since the cutting edge is fixedly positioned at the predetermined distance D below the belt surface, a U-shaped groove 14 is skived out of the surface of the belt by the relative movement between the belt and the cutting edge 26. As will be readily apparent, any suitable means for providing relative movement between the belt 16 and the blade of the cutting apparatus will be suitable for conducting the skiving method of this invention. Thus a moveable support table might be provided which moves the belt relative to the cutting apparatus 10. In another embodiment the support 40 for the cutting apparatus might be moveable while the belt is maintained in a fixed position. Also the belt may be drawn over the stationary support table 42 while the support 40 is stationary. Any such configuration is useful using the particular cutting apparatus described herein. The commercial advantages of utilizing a skiving apparatus such as the one described herein is that conventional conveyor belts can be utilized to form speciality belts having these longitudinal grooves cut in them for liquid dissipation or for troughing facilitation. These grooves may be cut at the same time the belt is being slit into the desired widths and/or when the edges are being trimmed on a cut edge conveyor belt. The conveyor belt 16 is best shown in FIG. 2 wherein the upper cover 50 and the lower cover 52 have positioned therebetween a varying number of reinforcement plies 54. It is understood that in the practice of this invention it may be desirable to skive through one or more of the reinforcing layers 54 in order to form a belt having the desired flexibility. It is readily apparent that that can be easily accomplished by simply lowering the blade 20 to the desired depth D in the belt and one or more layers of fabric as well as the cover 50 may be removed over the limited width of the desired groove. Similarly the lower cover 52 might be removed in order to provide a desired configuration on the return run of the conveyor belt. In that instance, of course, the conveyor belt can be inverted and the blade utilized in the same manner as previously described. The most advantageous positioning of the blade further is defined by the relationship of the bottom surface 32 of the cutting edge being substantially parallel to the surface 34 of the conveyor belt. It is understood that while the bottom surface 32 is parallel to the surface 34 of the belt it is set at a distance below the surface 34. That distance D is equal to the depth of the groove 14 being cut in the upper surface of the belt. The term U-shaped blade as used herein is understood to encompass not only the shape illustrated in FIG. 3 but also alternative shapes 50, 52, 54, 56 as shown in FIGS. 4–7. FIG. 7 illustrates a single upwardly extending arm 58 which may be used in place of the two parallel arms generally illustrated if the cutting blade design has sufficient rigidity to withstand the torsional stress exerted on the blade by the rubber during skiving.

While certain representative embodiments and details have been shown for the purpose of illustrating the invention, it will be apparent to those skilled in this art that various changes and modifications in the details of the invention may be made, accordingly the invention is limited only by the claims appended here below.

What is claimed is:

1. A cutting apparatus for skiving a longitudinal strip from a rubber conveyor belt comprising:

a U-shaped blade angled relative to the belt, having a leading edge and being composed of a cutting portion connecting two upwardly and forwardly extending arms, said cutting portion having a sharp cutting edge with an upper surface and a lower surface forming a 5° to 25° taper angle therebetween and lying wholly in an imaginary plane containing said leading edge, said lower surface of said cutting edge being substantially parallel to said conveyor belt; and a blade holding means fixedly attached to said upwardly extending arms, said blade holding means including forwardly angled slots which receive said arms therein to maintain said upper surface of said cutting edge at a 5° to 25° acute angle relative to the conveyor belt.

2. A cutting apparatus according to claim 1 wherein said acute angle is substantially equal to said taper angle.

3. A cutting apparatus according to claim 1 wherein said acute angle is less than said taper angle.

4. A cutting apparatus according to claim 1 wherein said taper angle is between 13° and 17°.

5. A cutting apparatus according to claim 1 wherein said blade holding means includes a means for limiting movement of said arms in said forwardly angled slots.

6. A cutting apparatus according to claim 1 further comprising a belt supporting means adapted to maintain said conveyor belt in a plane parallel to said cutting edge of said blade; and a means for moving said blade holding means in a direction perpendicular to said cutting edge of said blade; and a means for maintaining a predetermined distance between said cutting edge and said belt supporting means.

7. A method for forming longitudinal grooves of predetermined depth in a rubber belt having a longitudinal direction, a top surface, a top cover, a bottom cover and a plurality of reinforcing layers positioned between said top cover and bottom cover, said method comprising the steps of:

(a) rigidly positioning a U-shaped blade at said predetermined depth below the top surface of the rubber belt, said U-shaped blade having a least one upwardly extending leg and a cutting portion with a cutting edge having an upper surface and a lower surface forming a taper angle of about 5° to about 25° therebetween positioned normal to the longitudinal direction and parallel to the top surface of said belt, said upper surface of said cutting edge forming an acute angle with said top surface of the belt said bottom surface being parallel with said top surface;

(b) supporting said rubber belt by a support means adapted to position said belt such that the cutting edge of said blade is at said predetermined depth below the top surface of said belt;

(c) moving said belt in the longitudinal direction in a path substantially perpendicular to said cutting edge of said blade;

skiving a longitudinal strip of said belt continuously from said belt, said longitudinal strip having a transverse cross-section equal in width to the cutting portion of said U-shaped blade and having a thickness equal to said predetermined depth; and (d) removing said longitudinal strip continuously from said cutting edge of said blade.

8. A method according to claim 7 wherein said positioning step (c) further comprises affixing said U-shaped blade such that said acute angle and said taper angle are substantially equal.

9. A method according to claim 7 wherein said positioning step (a), includes positioning said lower surface of said cutting edge substantially parallel to said top surface of said rubber belt.

10. A method according to claim 7 wherein said positioning step further comprises setting said U-shaped blade at a predetermined depth below the top surface of said rubber belt such that at least one of said plurality of reinforcing layers is removed with said longitudinal strip upon completion of said supporting, moving and removing steps of said method.

* * * * *